(12) United States Patent
Altshuller et al.

(10) Patent No.: US 7,630,712 B2
(45) Date of Patent: Dec. 8, 2009

(54) METHOD FOR RECONNECTING A MOBILE TERMINAL IN A WIRELESS NETWORK

(75) Inventors: Mark Altshuller, Netanya (IL); Oleg Marinchenco, Modein (IL); Leonid Shousterman, Herzlia (IL)

(73) Assignee: Alvarion Ltd., Tel-Aviv (IL)

( * ) Notice: Subject to any disclaimer, the term of this patent is extended or adjusted under 35 U.S.C. 154(b) by 404 days.

(21) Appl. No.: 11/375,243

(22) Filed: Mar. 15, 2006

(65) Prior Publication Data

US 2007/0218896 A1 Sep. 20, 2007

(51) Int. Cl.
*H04W 4/00* (2009.01)
(52) U.S. Cl. ............... 455/432.1; 455/436; 455/422.1; 455/438; 455/439
(58) Field of Classification Search .............. 455/432.1, 455/436, 422.1, 438, 439
See application file for complete search history.

(56) References Cited

U.S. PATENT DOCUMENTS 6,463,055 B1 * 10/2002 Lupien et al. ............... 370/353

2008/0049674 A1 * 2/2008 Cha et al. ................... 370/331

OTHER PUBLICATIONS

"WiMax End-to-End Network Systems Architecture", WiMax Forum, Sep. 15, 2005 pp. 177-179.*

* cited by examiner

*Primary Examiner*—Patrick N Edouard
*Assistant Examiner*—Justin Y Lee
(74) *Attorney, Agent, or Firm*—Browdy and Neimark, PLLC

(57) ABSTRACT

A method for re-connecting a mobile terminal roaming in a wireless network via a target base station (TBS) after the occurrence of an uncontrolled disconnection of the mobile from a serving base station (SBS) via which the mobile was receiving and transmitting communications prior to the uncontrolled disconnection. An entity is established associated with the wireless network operative as a single authentication access entity (SAE) for the mobile, as long as its location remains within that wireless network, the identity of which is sent to the SBS. Following the occurrence of uncontrolled disconnection and in response to the mobile sending an indication to the TBS, the TBS is requested to execute the entry of the mobile as a handover process. The SBS transmits the identity of the SAE to the TBS. At the TBS, parameters associated with the mobile are retrieved from the SAE.

5 Claims, 2 Drawing Sheets

METHOD FOR RECONNECTING A MOBILE TERMINAL IN A WIRELESS NETWORK

FIELD OF THE INVENTION

The present invention relates to mobile wireless communications and, in particular, to the authentication of mobile terminals in mobile IP based wireless communications systems.

LEGEND

The following are the meanings of certain abbreviations used hereinafter in the description of the invention:
AAA—Authentication, Authorization and Accounting
AKn—Acknowledge message
ASN—Access Service Network
BS—Base Station
GW—Gateway
HO—Handover
IP—Internet Protocol
MS—Mobile Subscriber station (also used as mobile terminal)

BACKGROUND OF THE INVENTION

Mobile units, e.g. telephones, laptop computers, etc. are known to be able to roam in wireless networks between various locations. Still, while roaming through various networks and sub-networks they need to maintain their connectivity. Various aspects relating to this mode of operation were suggested by the IETF ("Internet Engineering Task Force") and are described among others in a series of RFC (Request for Comment) documents. One of the well-known problems associated with wireless terminals, and in particularly with roaming mobile terminals, is the disconnection occurring due to any one of numerous reasons. The problem intensifies when dealing with such roaming mobile terminals, because of the fact that at the time of their disconnection they roam in a network, and as such, when they try to reconnect they have to undergo a full network re-entry procedure which includes their re-authentication through the various entities along the way and of course through the authenticating entity at their home network. This is an issue which the present invention seeks to avoid, by eliminating the full above described procedure when the mobile terminal gracelessly disconnects from the serving BS (e.g. signal lost) and tries to re-connect to a new (or even the old) BS, but without compromising on security requirements so that the integrity of the network security will not be breached.

SUMMARY OF THE INVENTION

It is an object of the present invention to provide a better service experience to the user (for example IP session continuity) even in wireless network with relatively bad coverage.

It is another object of the present invention to provide a method by which a full re-entry and re-authentication can be avoided when a mobile terminal losses connectivity (signal) with one BS and than appears (after some time) as an entity trying to establish communication through another BS.

It is yet another object of the present invention to avoid interacting with the AAA server every time the mobile station re-establishes the connection through a new BS, as such interaction might result in undesired creation of a new billing record, every time the mobile terminal repeats its attempt to re-connect.

Other objects of the invention will become apparent as the description of the invention proceeds.

According to an embodiment of the present invention, there is provided a method for re-connecting a mobile terminal roaming in a wireless network via a target base station after the occurrence of an uncontrolled disconnection of communications between that mobile terminal and a serving base station via which the mobile terminal was receiving and transmitting communications prior to the uncontrolled disconnection. The method comprises the steps of:

establishing an entity associated with the wireless network for serving as a single authentication access entity for said mobile terminal, as long as its location remains within said wireless network;

providing the serving base station with an indication of the identity of that single authentication access entity;

following the occurrence of uncontrolled disconnection and in response to an attempt made by the mobile terminal to reconnect to the wireless network via the target base station, receiving at the target base station an indication of the identity of the single authentication access entity, transmitted by the serving base station; and at the target base station, retrieving parameters associated with the mobile terminal from the single authentication access entity.

According to an embodiment of the invention, the attempt made by the mobile terminal to reconnect via a target base station comprises sending an indication by the terminal to the target base station, to execute the entry of the mobile terminal as a handover process.

According to another preferred embodiment of the invention, the single authentication access entity is associated with a network access server that is operative to communicate with the serving base station. Preferably, the network access server is an access server is an access service network gateway ("ASN GW").

In accordance with still another preferred embodiment of the invention, the receiving of the indication about the identity of the single authentication access entity, is preceded by the following steps:

providing the target base station by the mobile terminal an indication of the serving base station identity; and initiating by the target base station a request to the serving base station to provide the indication regarding the identity of the single authentication access entity.

By yet another preferred embodiment, the serving base station stores pre-defined information concerning the mobile terminal for a pre-determined period of time following an uncontrolled disconnection of communication with that mobile terminal. Preferably the pre-defined information comprises the identity of the single authentication access entity.

In accordance with still another preferred embodiment of the invention, the event of uncontrolled disconnection is a member of the group consisting of:

loss of connectivity between the serving base station and the mobile terminal, where the latter has not transmitted a handover (HO) request or HO indication message;

loss of connectivity between the serving base station and the mobile terminal, after receiving at the serving base station a partial indication of a HO process that the mobile terminal is about to undergo, e.g. when no request for information regarding the mobile terminal from another base station has followed a HO message transmitted by the mobile terminal, within a second pre-determined period of time;

the mobile terminal has indicated a group of different base stations in its HO request, where the target base station has not been included in that group;

any combination of the above.

DETAILED DESCRIPTION OF THE INVENTION

A better understanding of the present invention is obtained when the following non-limiting detailed description is considered in conjunction with the following drawings.

As will be appreciated by those skilled in the art, one of the objects of the method provided by the present invention, is, to allow the operator to manage its wireless network in such a way that if during a certain period following the disconnection of the mobile terminal from its serving base station, that terminal will start communicating with another base station, there will be no need to go through the full re-entry and authentication processes, whereas after the expiration of that period, the mobile terminal will have to undergo the full re-entry process (even if the mobile terminal did send the ID of the serving BS and a HO indication in the Ranging Request message transmitted to the new base station (Ranging Purpose Indication bit #0 is set to 1).

Figure 1:
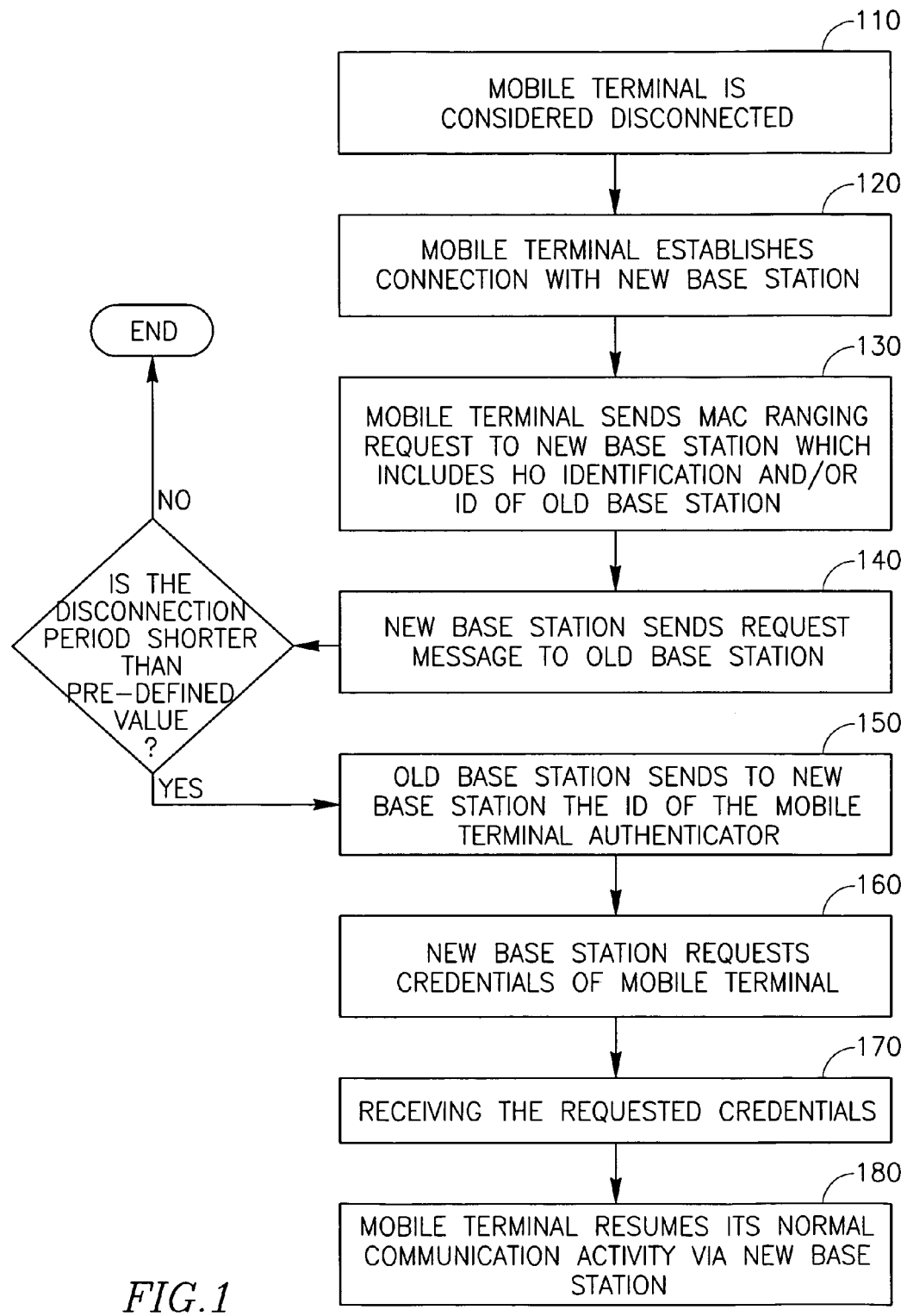
FIG. 1—presents a flow chart demonstrating the method provided by the present invention.

Let us consider now FIG. 1 which is a schematic flow chart of a method exemplifying the present invention. In step 110, the mobile terminal that has been served by a serving base station is now considered by its serving base station as being disconnected.

Next, the mobile terminal tries to establish communication through a target (new) base station (step 120), which is not aware of its authenticity as has already been established when it was communicating through the serving base station and the appropriate ASN. It should be noted that the present invention is independent of the fact whether the serving base station and the target base station are both associated with the same or different ASN GWs.

A number of situations may lead to the above steps 110 and 120. For example, if the mobile terminal lost connectivity with the serving BS without indicating any HO triggering (HO Request or HO Indication messaging), if the mobile terminal lost connectivity with the serving BS after partial indication of the HO triggering (e.g. the MS sent HO Request without waiting for a response from the serving BS) and no target BS has requested the MS security credentials from the serving BS, or if the mobile terminal indicated different group of Target BSs in the HO Request among which the new BS has not been included.

The mobile terminal then sends a MAC Ranging Request to the target BS (step 130) in which it includes the ID of its old Serving BS ID, and preferably sets HO indication (Ranging Purpose Indication bit #0 is set to 1).

The target base station then sends a request message to the old serving base station (step 140) in order to receive the ID of the authenticator (e.g. the ASN GW) through which the mobile terminal has already been authenticated.

The old serving base station may either respond by providing the target base station with the required information, or preferably, by checking the period that has lapsed since the disconnection of the mobile terminal (in step 110) till the receipt of the request from the target base station, and only if it is determined that period that has lapsed is shorter than a pre-defined period of time, will it provide the new base station with the ID of the mobile terminal's authenticator (step 150).

The target base station then sends a message to the authenticator, requesting the credentials of the mobile terminal (step 160), and upon receiving them (step 170) the mobile terminal is able to resume its normal communication activity (step 180), i.e. to receive transmissions addressed thereto and to send transmissions therefrom.

Figure 2:
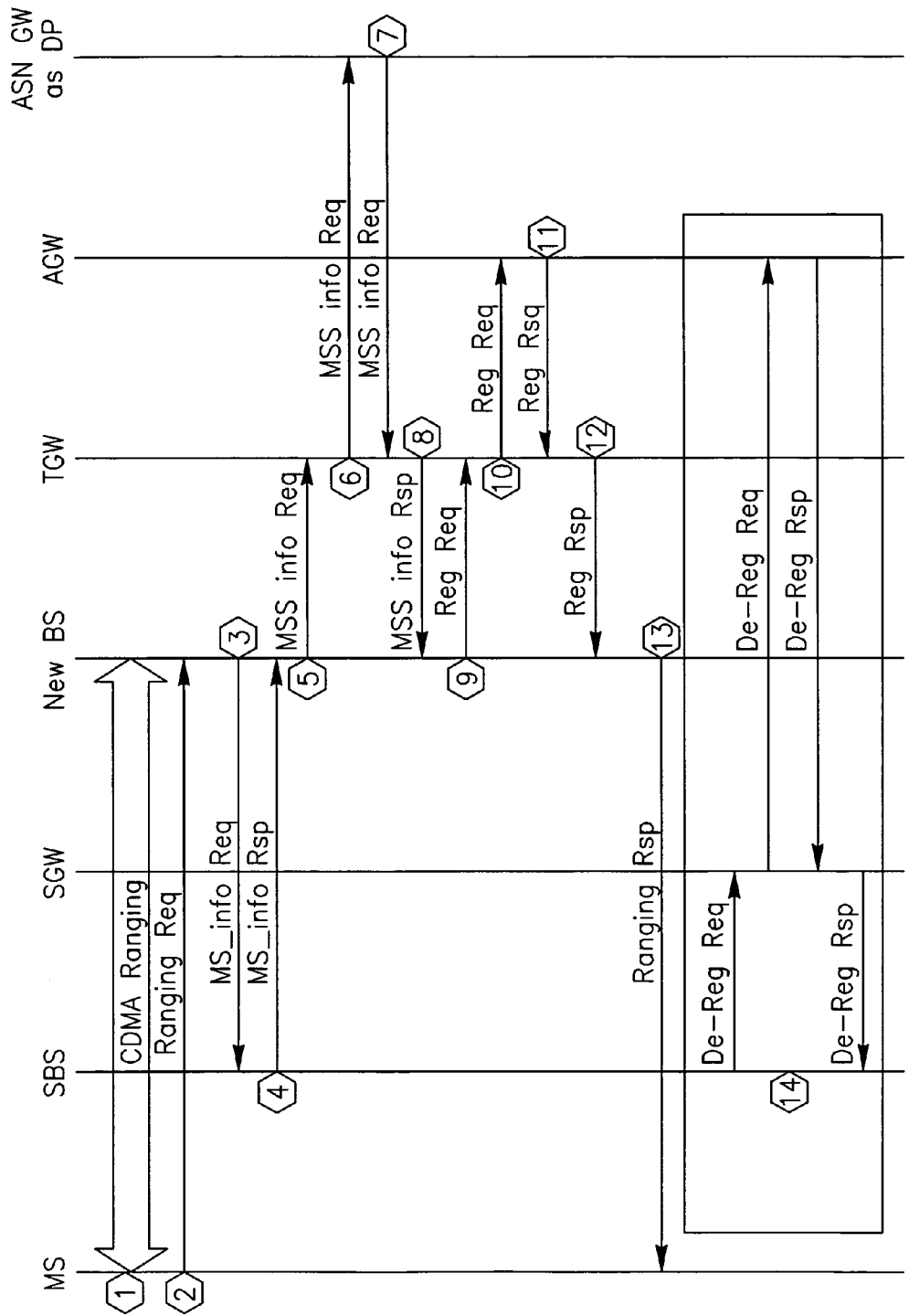
FIG. 2—presents an illustration of example messages exchanged between the various entities involved in the re-entry process according to the present invention.

FIG. 2 provides an example of messages that can be used in this process, in which the different steps are shown at their appropriate time line.

Step 1—The MS and the target BS conduct a normal CDMA ranging process;

Step 2—The MS sends Ranging Request message with the ID of its last Serving BS ID.

Step 3—Upon receiving this message the new BS sends a message (e.g. MSS_Info Req) to the serving BS (using Serving BS ID field in the Ranging Request) to request the mobile terminal Anchored Authenticator ID. The Serving BS keeps the context of the MS for a certain period of time after the mobile terminal has left the serving BS.

Step 4—The serving BS shall respond with the Authenticator ID of the mobile terminal.

Steps 5-12—The serving BS uses processes defined within the framework of WiMAX NWG Forum to retrieve the mobile terminal security and any required additional information (e.g. Akn, QoS attributes, Anchored ASN GW ID) while requesting the designated Authenticator for the mobile terminal's credentials.

Step 13—The Serving MS completes the ranging process for the mobile terminal so that the network re-entry is completed. The new BS becomes new Serving BS.

Step 14—In the old Serving BS, deleting the previous context and data path associations with the MS.

As will be appreciated by those skilled in the art, the example provided shows a direct messaging procedure between the BSs. However, similar processes may be used when messages are sent through intermediate GWs, without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for re-connecting a mobile terminal roaming in a wireless network via a target base station after the occurrence of an uncontrolled disconnection of communications between said mobile terminal and a serving base station via which said mobile terminal was receiving and transmitting communications prior to said uncontrolled disconnection, and wherein said method comprises the steps of:

establishing an entity associated with said wireless network operative as a single authentication access entity for said mobile terminal, as long as the location of said mobile terminal remains within said wireless network;

providing the serving base station with an indication of the identity of said single authentication access entity;

following the occurrence of uncontrolled disconnection and in response to an attempt made by said mobile terminal to reconnect to said wireless network via said target base station, receiving at the target base station an indication of the identity of said single authentication access entity, transmitted by said serving base station; and at the target base station, retrieving parameters associated with said mobile terminal from the single authentication access entity, wherein said uncontrolled disconnection is a member of the group consisting of:

loss of connectivity between said serving base station and said mobile terminal, where the latter has not transmitted a handover request or a handover indication message;

loss of connectivity between said serving base station and said mobile terminal, after receiving at said serving base station a partial indication of a handover process that said mobile terminal is about to undergo;

receiving an indication, in a handover request transmitted by said mobile terminal, of a group comprising a plurality of base stations, and wherein said target base station has not been included in said group; and any combination thereof.

2. A method according to claim 1, wherein the step of receiving said indication, is preceded by the following steps:
   providing said target base station, by said mobile terminal, an indication of the serving base station identity; and
   initiating by said target base station a request addressed to said serving base station to provide an indication of the identity of said single authentication access entity.

3. A method according to claim 1, wherein said serving base station stores pre-defined information concerning said mobile terminal for a pre-determined period of time following an uncontrolled disconnection of communication with said mobile terminal.

4. A method according to claim 3, wherein said pre-defined information comprises the identity of said single authentication access entity.

5. A method according to claim 1, wherein the attempt made by said mobile terminal to reconnect via said target base station comprises sending an indication by the terminal to said target base station, requesting the latter to execute the entry of said mobile terminal as a handover process.

* * * * *